(12) United States Patent
Wang

(10) Patent No.: US 7,359,387 B2
(45) Date of Patent: Apr. 15, 2008

(54) SYSTEMS AND METHODS FOR IMPLEMENTING VIRTUAL ROUTER

(75) Inventor: Yang Wang, Vienna, VA (US)

(73) Assignee: Verizon Business Global LLC, Basking Ridge, NJ (US)

(*) Notice: Subject to any disclaimer, the term of this patent is extended or adjusted under 35 U.S.C. 154(b) by 1111 days.

(21) Appl. No.: 10/085,031

(22) Filed: Mar. 1, 2002

(65) Prior Publication Data

US 2003/0165144 A1 Sep. 4, 2003

(51) Int. Cl.
*H04L 12/28* (2006.01)

(52) U.S. Cl. ............... 370/400; 709/203

(58) Field of Classification Search ......... 370/400, 370/392, 412, 235, 413, 229, 230, 231, 232, 370/381, 389, 395.72; 709/203, 219
See application file for complete search history.

(56) References Cited

U.S. PATENT DOCUMENTS

| | | | | |
|---|---|---|---|---|
| 6,442,588 B1 * | 8/2002 | Clark et al. | ........ | 709/203 |
| 6,597,699 B1 * | 7/2003 | Ayres | ........ | 370/400 |
| 6,628,609 B2 * | 9/2003 | Chapman et al. | ........ | 370/229 |
| 6,982,984 B1 * | 1/2006 | Asayesh et al. | ........ | 370/401 |
| 6,985,479 B2 * | 1/2006 | Leung et al. | ........ | 370/352 |
| 7,039,720 B2 * | 5/2006 | Alfieri et al. | ........ | 709/242 |
| 2003/0037165 A1 * | 2/2003 | Shinomiya | ........ | 709/238 |

* cited by examiner

*Primary Examiner*—Chi Pham
*Assistant Examiner*—Alexander O. Boakye (57) ABSTRACT

A router system includes a group of virtual routers that share at least one resource. The router system further includes a resource allocator that controls access to the at least one resource by the virtual routers.

27 Claims, 13 Drawing Sheets

| RSIB 610 | ID | INTERFACE BANDWIDTH | ROUTING TABLE SIZE | ROUTING TABLE POINTER | FORWARDING TABLE SIZE | FORWARDING TABLE POINTER | INTERNAL INTERFACE | INTERNAL INTERFACE ADDRESS |
|---|---|---|---|---|---|---|---|---|
| VIRTUAL ROUTER 1 | VR-CORE-1 | PORT 1: 2.5GBPS, PORT 2: 10GBPS, ... PORT M: 2.5GBPS | 4 MB | ROUTING TABLE MEMORY ENTRY ADDRESS | 2 MB | FORWARDING TABLE MEMORY ENTRY ADDRESS | VR-CORE-VI-1 | 10.1.1.1 |
| VIRTUAL ROUTER 2 | VR-CORE-2 | PORT 1: 1.5GBPS, PORT 2: 2GBPS, ... PORT M: 1.5GBPS | 4 MB | ROUTING TABLE MEMORY ENTRY ADDRESS | 2 MB | FORWARDING TABLE MEMORY ENTRY ADDRESS | VR-CORE-VI-2 | 10.1.1.2 |
| ••• | ••• | ••• | ••• | ••• | ••• | ••• | ••• | ••• |
| VIRTUAL ROUTER N | VR-CORE-N | PORT 1: 2.5GBPS, PORT 2: 5GBPS, ... PORT M: 2.5GBPS | 4 MB | ROUTING TABLE MEMORY ENTRY ADDRESS | 2 MB | FORWARDING TABLE MEMORY ENTRY ADDRESS | VR-CORE-VI-N | 10.1.1.9 |

SYSTEMS AND METHODS FOR IMPLEMENTING VIRTUAL ROUTER

FIELD OF THE INVENTION

The present invention relates generally to network data routing and, more particularly, to high performance network routing systems.

BACKGROUND OF THE INVENTION

Routers are devices that direct traffic flow through networks. In particular, routers receive data packets, determine the next network point to which the packets should be forwarded, and then transmit the packets to the determined next network point.

In general, routers can be classified into a number of categories based on their traffic handling capacity. Backbone routers, for example, are high-performance routers that are typically implemented at the end-points of high-capacity network links. In the context of the Internet, for example, backbone routers may be implemented at connection points of high-capacity and optical links. Regional routers, in contrast, may be implemented as mid-range routers, having a routing capacity at a level below the backbone routers. Edge routers may have a lower routing capacity than the regional routers and are usually implemented at edges of an Internet Service Provider (ISP). The edge router controls packet transfer from the customer network or from other networks of the ISP. Edge routers are sometimes referred to as boundary routers.

Figure 1:
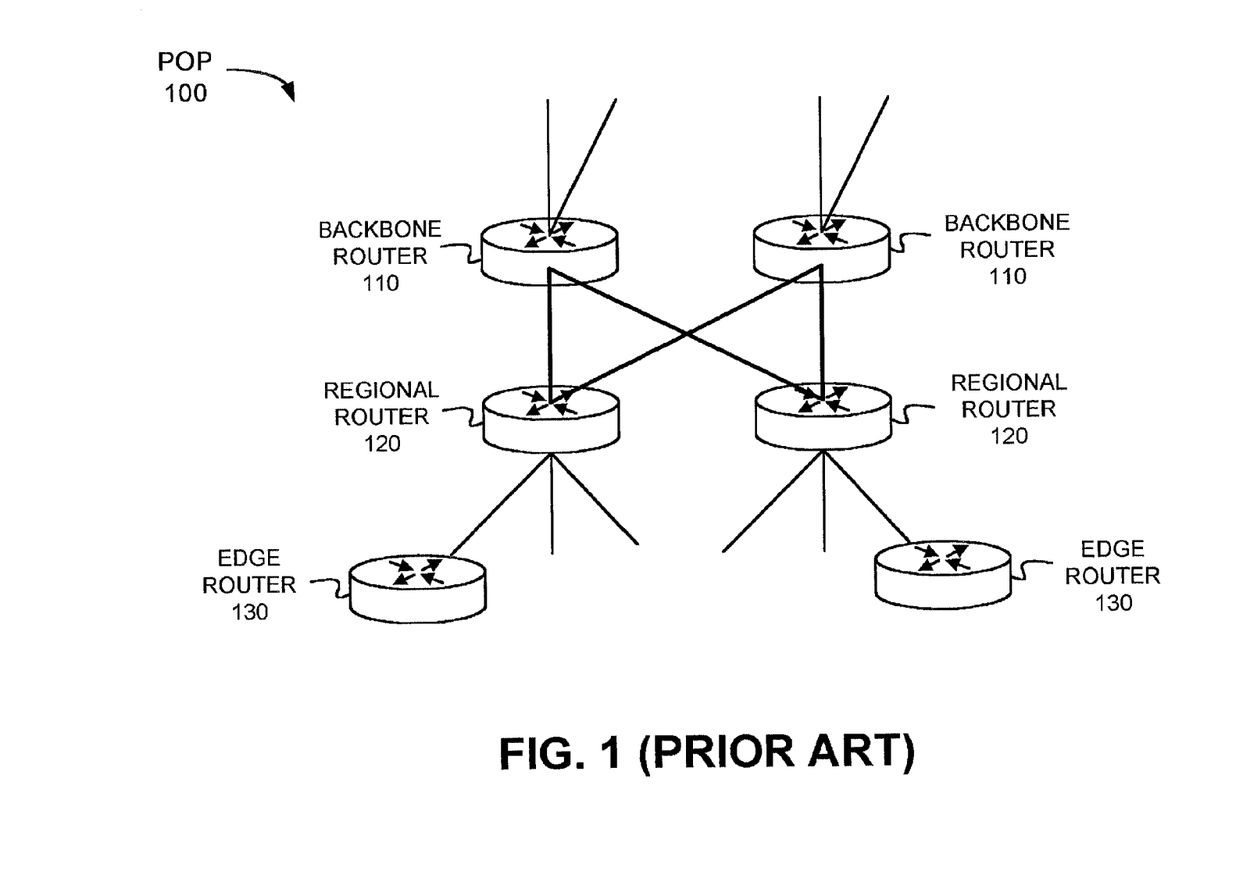
FIG. 1 is a diagram illustrating the inter-connection of a number of routers in a network.

FIG. 1 is a diagram illustrating the inter-connection of a number of routers in a network. Backbone routers 110 interface with a network backbone, such as an optical backbone of the Internet. Backbone routers 110 connect to regional routers 120. Regional routers 120 further connect to edge routers 130. Backbone routers 110, regional routers 120, and edge routers 130 may together implement a point-of-presence (POP) 100 for a network, such as the Internet. Each router within POP 100 may have a unique address, such as a unique Internet Protocol (IP) address.

POPs are frequently owned by Internet Service Providers (ISPs) and are used to provide network access to the customers of the ISP. One disadvantage of the router configuration illustrated in FIG. 1 is that the routers of POP 100 use a number of ports to communicate with one another. For example, as illustrated, each of backbone routers 110 uses two ports, one for each communication line shown in FIG. 1, to communicate with regional routers 120. Similarly, regional routers 120 use two ports to communicate with backbone routers 110.

Routers may use line cards to physically implement data transmission/reception at ports of the routers. Line cards, however, can be relatively expensive components. Accordingly, interconnecting routers 110, 120, and 130 at POP 100 can be a relatively expensive endeavor.

Accordingly, there is a need in the art to more efficiently implement the functionality of multiple different routers within a single ISP or POP.

SUMMARY OF THE INVENTION

Systems and methods consistent with the principles of this invention address this and other needs by providing a router system that includes multiple virtual routers capable of operating as functionally different routers.

In an implementation consistent with the present invention, a router system includes a group of virtual routers that share at least one resource. The router system further includes a resource allocator that controls access to the at least one resource by the virtual routers.

In another implementation consistent with the present invention, a method for configuring a router system is disclosed. The method includes configuring a group of virtual routers, defining at least one resource to be shared by the virtual routers, and creating a router profile for each of the virtual routers.

In yet another implementation consistent with the present invention, a method for controlling allocation of a group of shared resources by a group of virtual routers in a router system is disclosed. The method includes receiving a request for allocation of one of the shared resources from at least one of the virtual routers, where the request includes security information; determining whether the request is authentic based on the security information; and granting the request when the request is authentic.

In still another implementation consistent with the present invention, a router system includes a group of virtual routers, a resource-shared information base, and a resource allocator. The virtual routers are configured to share at least one resource. Each of the virtual routers is associated with a router profile that defines a security level and resource sharing priority for the virtual router. The resource-shared information base maintains the at least one resource. The resource allocator receives a request for access to the at least one resource and grants access to the at least one resource to one of the virtual routers based on the profile of the one virtual router.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the present invention provide systems and methods for implementing a virtual router system in a communication network. According to one implementation, the router system includes a group of individual virtual routers that are associated with a router profile and share a physical resource of the router system. A resource allocator grants access to the shared resource to a virtual router based on the router's profile.

Exemplary System

Figure 2:
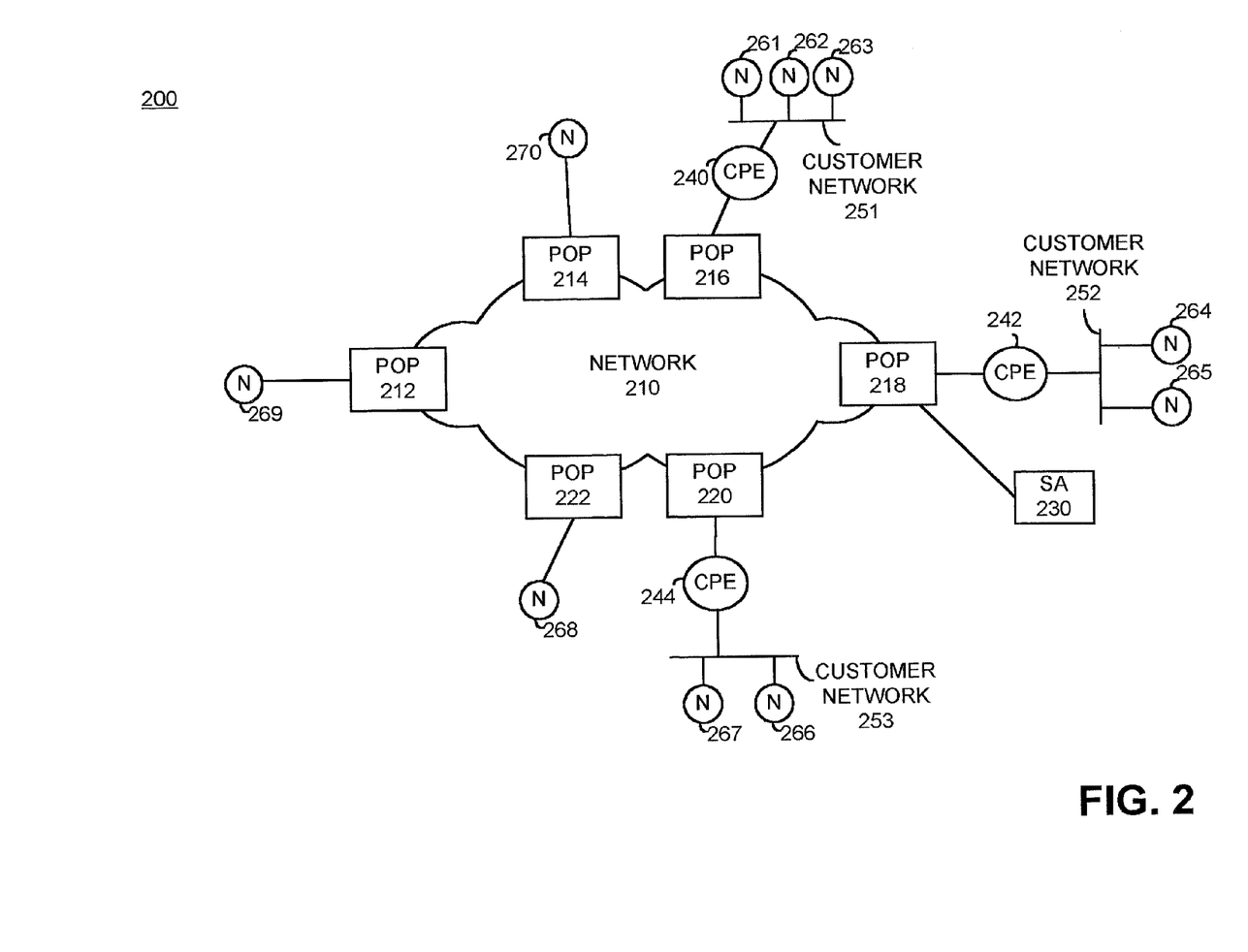
FIG. 2 illustrates an exemplary system in which systems and methods, consistent with the present invention, may be implemented.

FIG. 2 illustrates an exemplary system 200 in which systems and methods, consistent with the present invention, may be implemented. In FIG. 2, system 200 includes a network 210, points of presence (POPs) 212-222, a system administrator (SA) device 230, and a group of nodes 261-270 that may be directly connected to a POP 212-222 or connected via a customer network 251-253 and customer premise equipment (CPE) 240-244.

The network 210 may include, for example, the Internet, an intranet, a local area network (LAN), a metropolitan area network (MAN), a wide area network (WAN), or the like. In fact, the network 210 may include any type of network or combination of networks that permits routing of information from a particular source to a particular destination.

The POPs 212-222 may include one or more router systems that decide, based on routing protocols (e.g., an Interior Gateway Protocol and/or an Exterior Gateway Protocol) and routing tables, how and where to send packets of information. Each POP 212-222 may also include one or more servers, such as an e-mail server or a World Wide Web server. Each POP 212-222 may be implemented via hardware and/or software.

The SA device 230 may include any type of computer system, such as a mainframe, minicomputer, or personal computer, capable of connecting to the network 210 to communicate with other devices, such as a POP 212-222, in the system 200. The SA device 230 may connect to a POP, such as POP 218, via a wired, wireless, or optical connection.

The CPEs 240-244 may include one or more routers for connecting a customer network 251-253 to a POP 212-220. The customer networks 251-253 may include any type of local network, such as a LAN, MAN, WAN, or the like, that permits routing of information packets among the nodes connected to the respective network. The nodes 261-270 may include computers, such as workstations and servers, or any other type of device that has a network interface card (NIC), such as a printer or modem. Moreover, the nodes 261-270 may include devices, such as a personal digital assistant, that connect to a particular local network via a wireless connection.

The number of components illustrated in FIG. 2 is provided for simplicity. In practice, a typical system 200 may include a larger or smaller number of networks, POPs, SA devices, CPEs, customer networks, and/or nodes.

Figure 3:
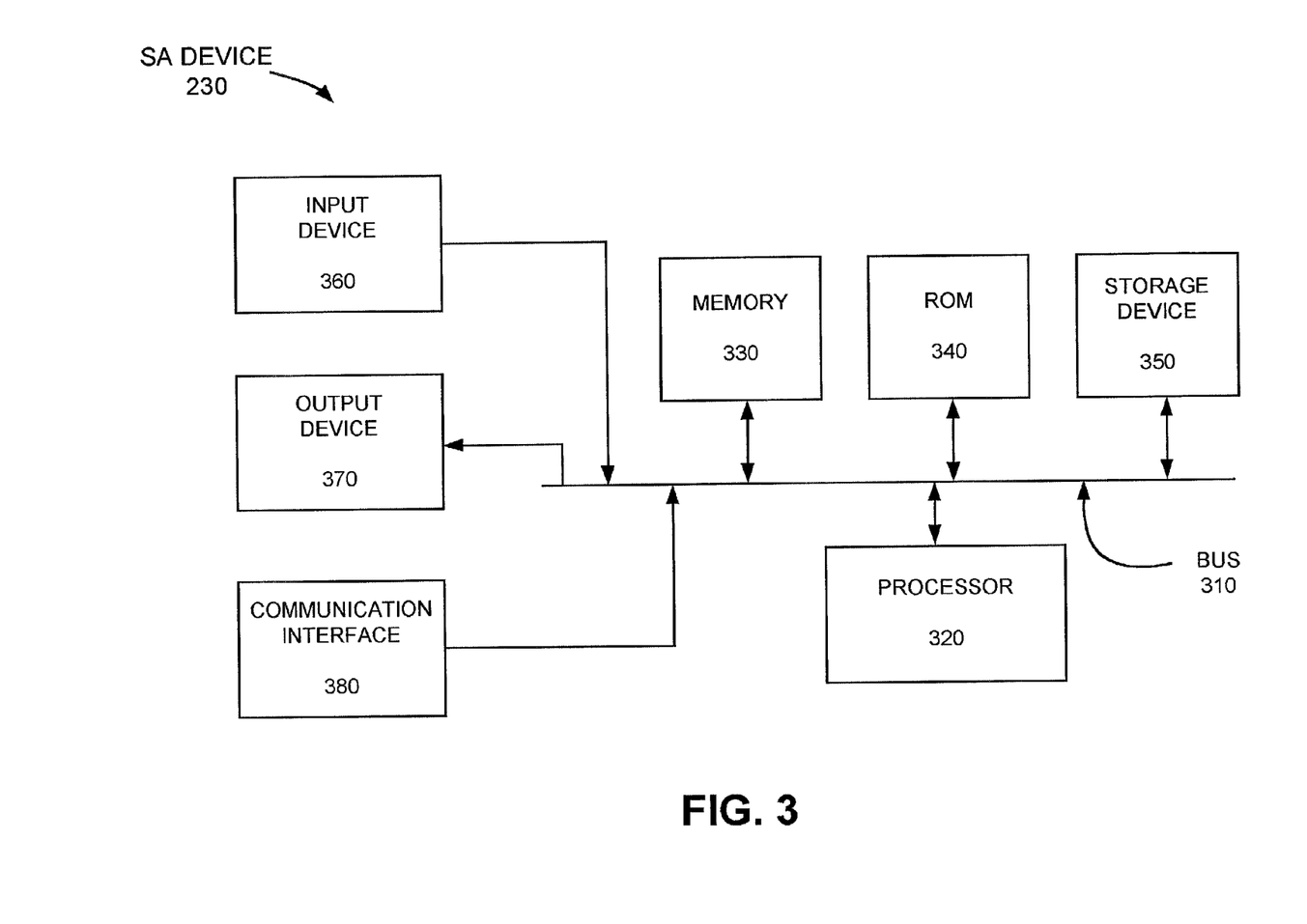
FIG. 3 illustrates an exemplary system administrator device consistent with the present invention.

FIG. 3 illustrates an exemplary SA device 230 consistent with the present invention. In FIG. 3, the SA device 230 includes a bus 310, a processor 320, a memory 330, a read only memory (ROM) 340, a storage device 350, an input device 360, an output device 370, and a communication interface 380. The bus 310 may include one or more conventional buses that permit communication among the components of the SA device 230.

The processor 320 may include any type of conventional processor or microprocessor that interprets and executes instructions. The memory 330 may include a random access memory (RAM) or another type of dynamic storage device that stores information and instructions for execution by the processor 320. The memory 330 may also be used to store temporary variables or other intermediate information during execution of instructions by processor 320.

The ROM 340 may include a conventional ROM device and/or another type of static storage device that stores static information and instructions for the processor 320. The storage device 350 may include a magnetic disk or optical disk and its corresponding drive and/or some other type of magnetic or optical recording medium and its corresponding drive for storing information and/or instructions.

The input device 360 may include any conventional mechanism that permits an operator to input information to the SA device 230, such as a keyboard, a mouse, a microphone, a pen, a biometric input device, such as voice recognition device, etc. The output device 370 may include any conventional mechanism that outputs information to the operator, including a display, a printer, a speaker, etc.

The communication interface 380 may include any transceiver-like mechanism that enables the SA device 230 to communicate with other devices and/or systems, such as POP 218. For example, the communication interface 380 may include a modem or an Ethernet interface to a network. Alternatively, communication interface 380 may include other mechanisms for communicating via a data network.

Figure 4:
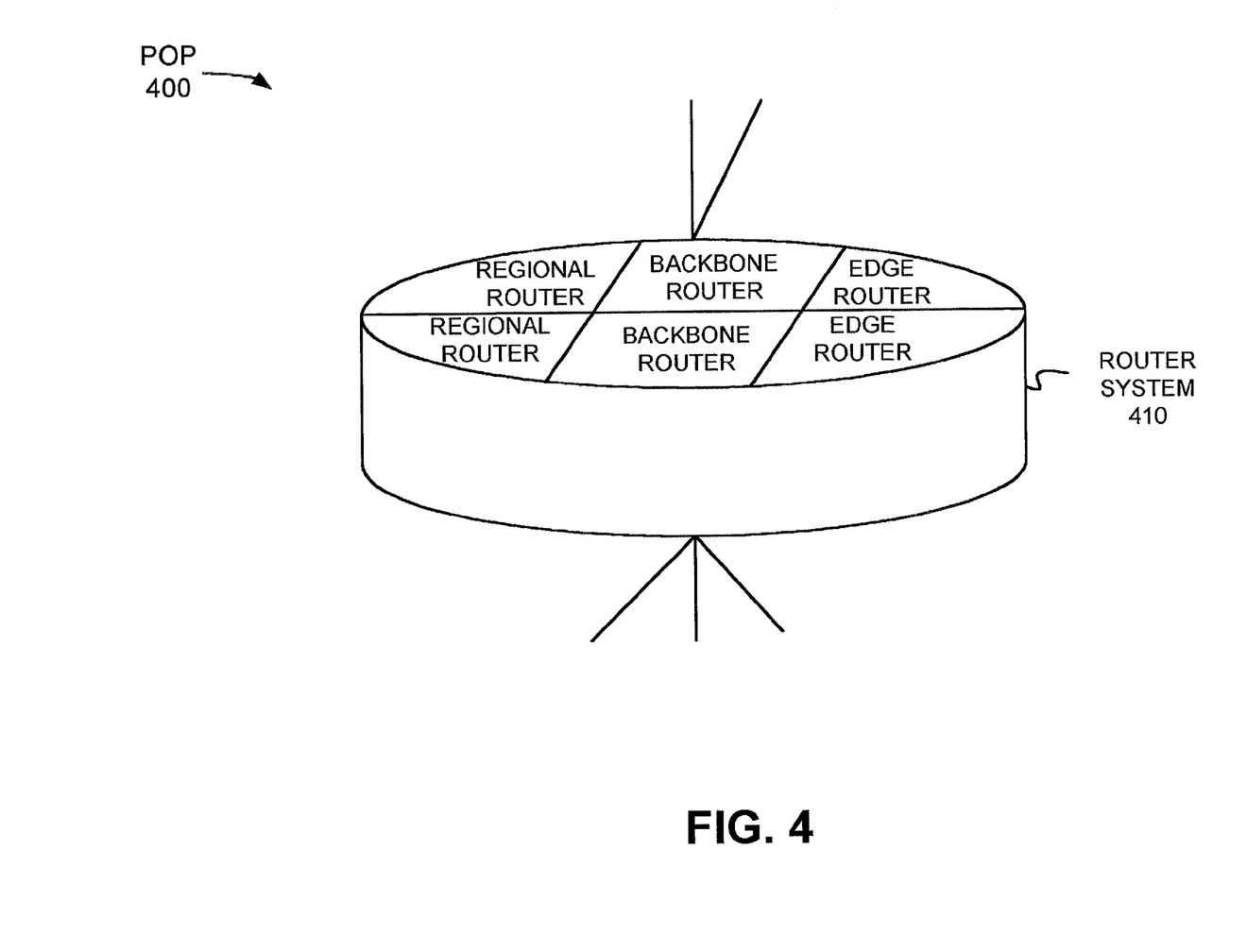
FIG. 4 illustrates an exemplary POP configuration in an implementation consistent with the present invention.

FIG. 4 illustrates an exemplary POP 400 configuration in an implementation consistent with the present invention. In FIG. 4, the individual physical routers 110-130 of a conventional POP 100 are replaced with a single, high-capacity router system 410. The router system 410 is logically separated into individual virtual routers capable of implementing functionally different routing processes.

Figure 5:
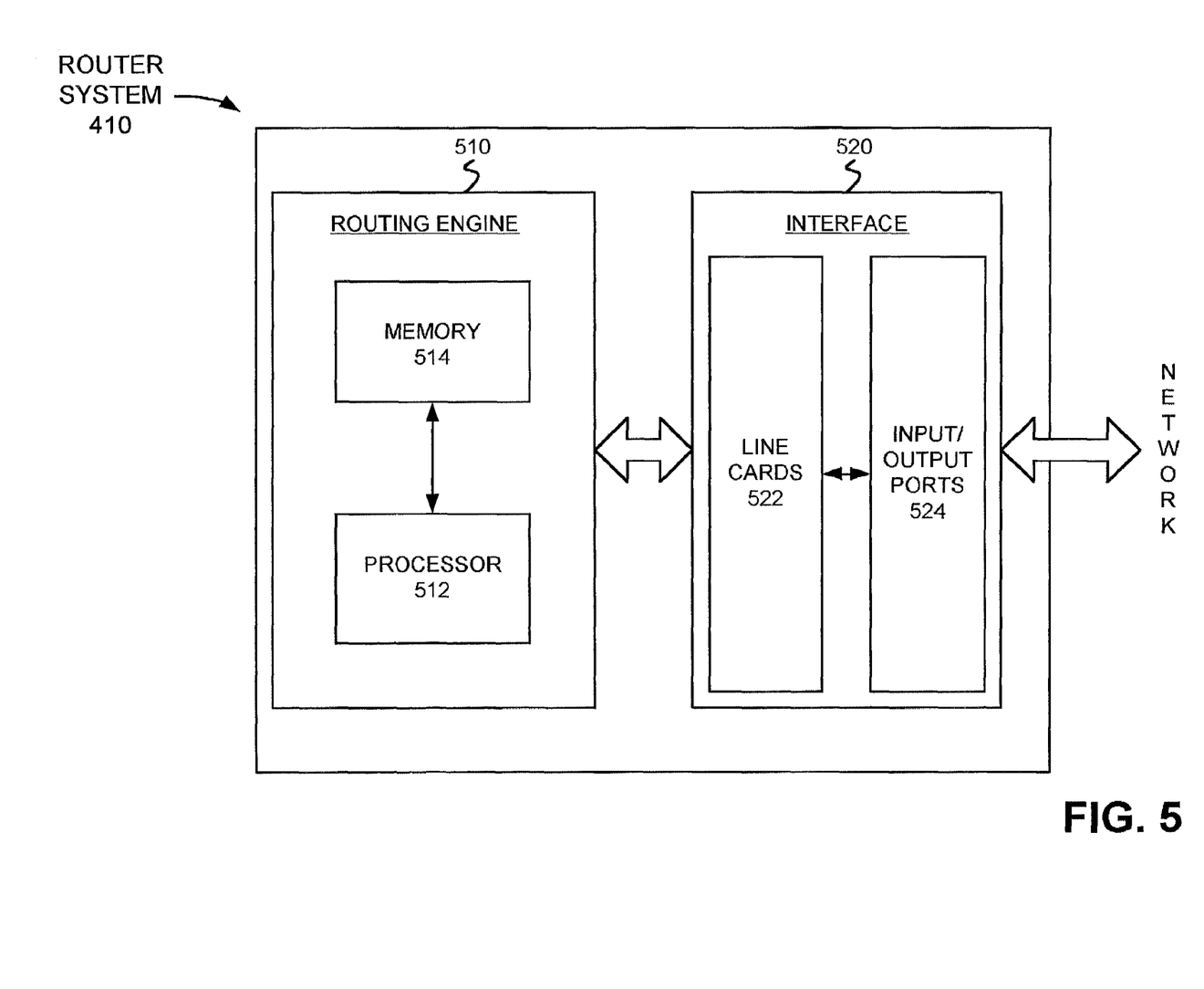
FIG. 5 illustrates an exemplary configuration of the router system of FIG. 4 in an implementation consistent with the present invention.

FIG. 5 illustrates an exemplary configuration of the router system 410 of FIG. 4. As illustrated, the router system 410 includes a routing engine 510 and an interface 520. The number of components illustrated in FIG. 5 is provided for simplicity. It will be appreciated that a typical routing system may include other devices (not shown) that aid in receiving, processing, and/or transmitting data.

The routing engine 510 may include a processor 512 and a memory 514. The processor 512 may include one or more conventional processors, microprocessors, or the like. The processor 512 determines the path on which a received packet is to be routed through a network, such as network 210, toward its ultimate destination based on information contained in memory 514.

The memory 514 may include any type of conventional storage device. The memory 514 stores instructions and information that aids in the routing of packets in the network. The memory 514 may include one or more conventional databases, such as a Link State Database or a PATHS Database. The memory 514 may also store one or more routing tables that allow for routing of received packets.

The routing engine 510 acts in response to the processor 512 executing sequences of instructions contained in the memory 514. Such instructions may be read into the memory 514 from another computer-readable medium (a computer-readable medium may include one or more memory devices or carrier waves) or from a separate device. Execution of the sequences of instructions contained in the memory 514 causes the processor 512 to perform the functions that will be described hereafter. In alternative embodiments, hardwired circuitry may be used in place of or in combination with software instructions to implement the present invention. Thus, the present invention is not limited to any specific combination of hardware circuitry and software.

The interface 520 may include any type of conventional interface that provides a physical connection between the routing engine 510 and the network 210 and any necessary packet conditioning, such as adding a layer 1 header to an outgoing packet. As illustrated, the interface 520 includes line cards 522 and input/output ports 524.

The line cards 522 may include memory and one or more forwarding processors that create and store forwarding tables for the virtual routers within the router system 410. The input/output ports 524 include the physical connections by which packets are transmitted and received. In practice, the router system 410 may include one line card for each port with which the router system 410 is associated.

Figure 6:
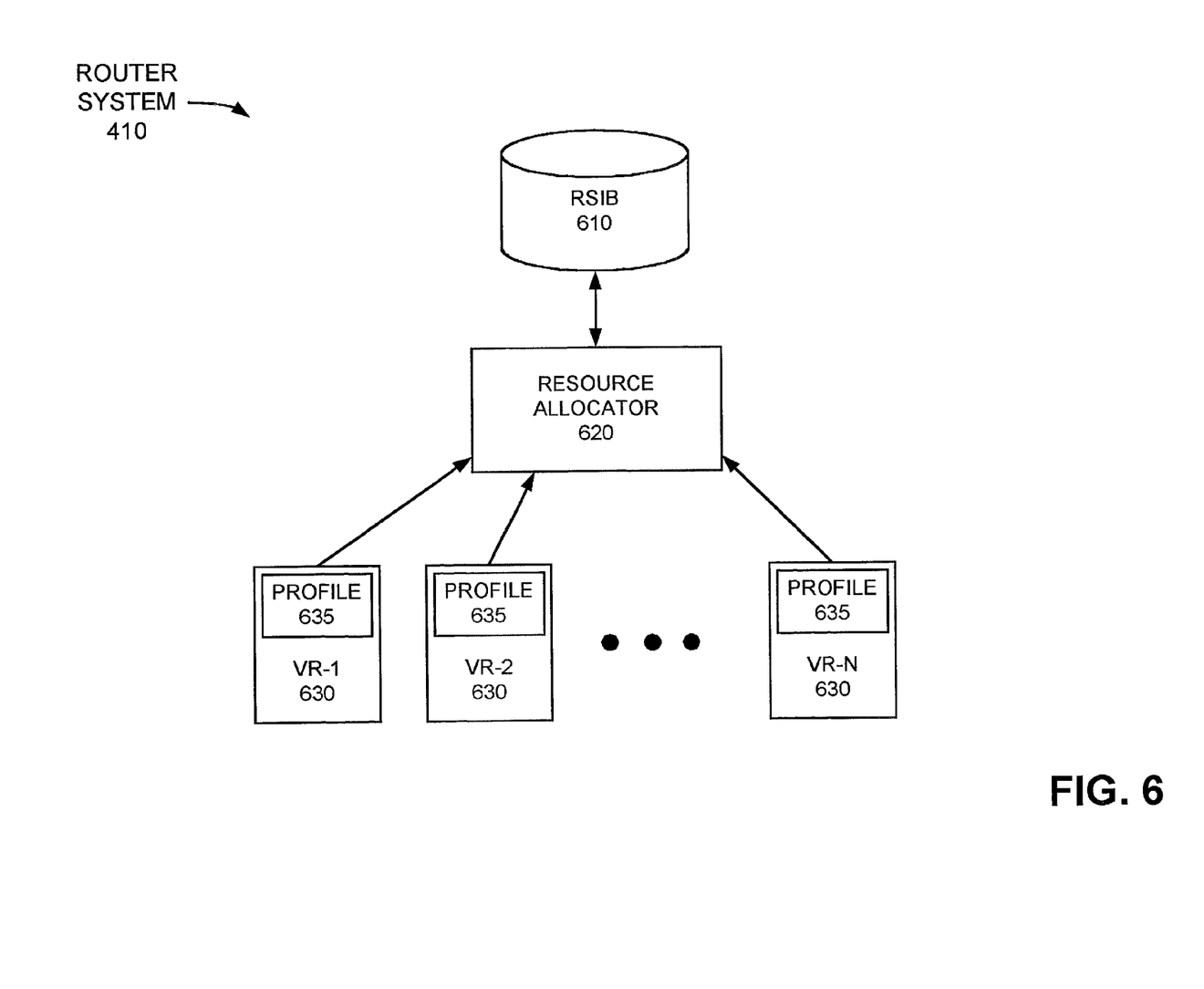
FIG. 6 illustrates an exemplary functional block diagram of the router system of FIG. 4 in an implementation consistent with the present invention.

FIG. 6 illustrates an exemplary functional block diagram of the router system 410 of FIG. 4 in an implementation consistent with the present invention. The router system 410 may include a resource-shared information base (RSIB) 610, a resource allocator 620, and a group of virtual routers VR-1 to VR-N 630.

The RSIB 610 maintains all physical resources shared by the virtual routers 630 in the router system 410. The physical resources may include, for example, the memory space for storing the routing and forwarding tables, port bandwidth, processors' capabilities, etc. The RSIB 610 also stores attributes for each of the virtual routers 630.

Figure 7:
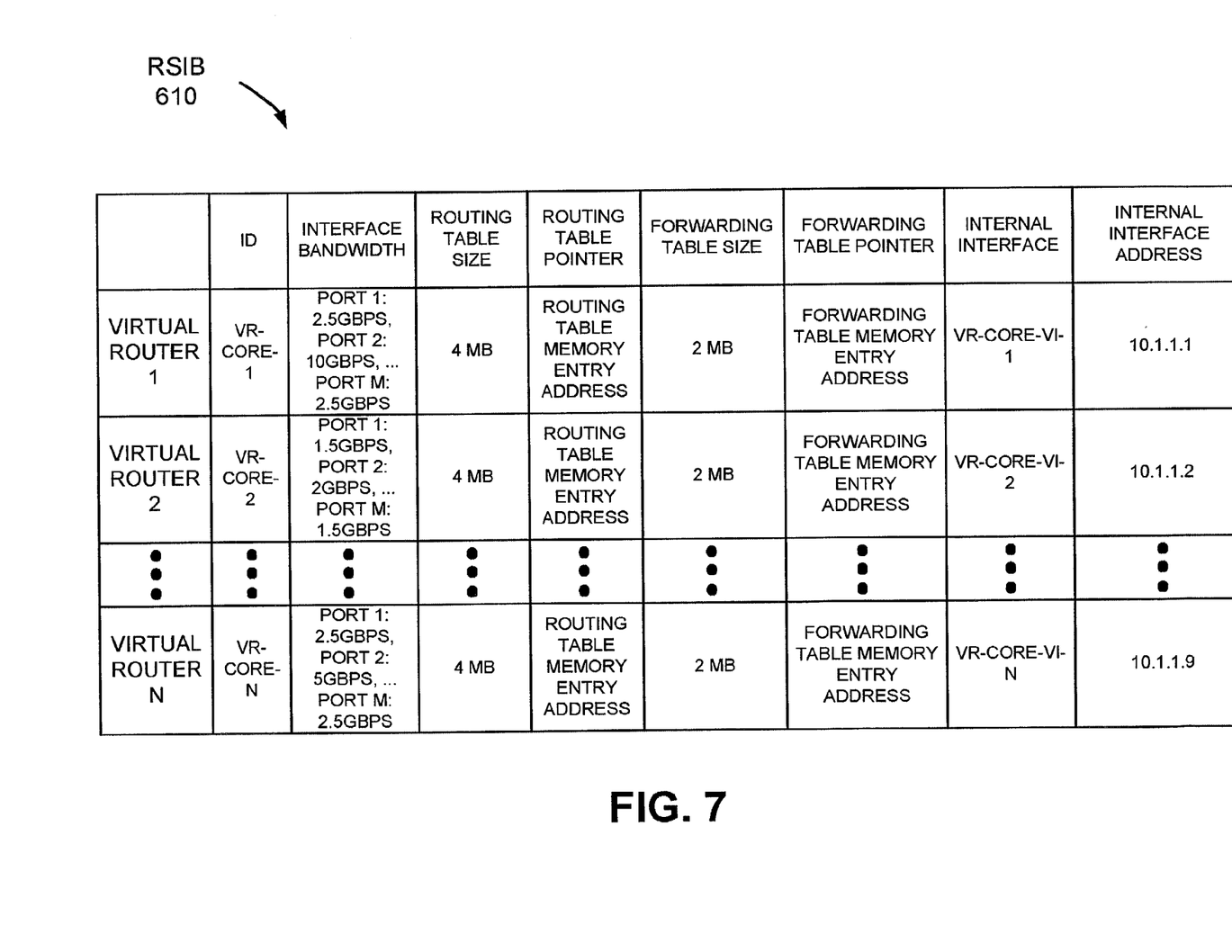
FIG. 7 illustrates an exemplary list of attributes that the resource-shared information base may store in an implementation consistent with the present invention.

FIG. 7 illustrates an exemplary list of attributes that the RSIB 610 may store in an implementation consistent with the present invention. As illustrated, the RSIB 610 may store the following attributes for each of the virtual routers 630: a virtual router identifier (ID), an interface bandwidth parameter, a routing table size parameter, a routing table pointer, a forwarding table size parameter, a forwarding table pointer, an internal interface parameter, and an internal interface address. It will be appreciated that the RSIB 610 may include other or different attributes (not shown) that aid in configuring the virtual routers 630.

The virtual router ID uniquely identifies the virtual router. As illustrated in FIG. 7, an exemplary ID for virtual router 1 may be "vr-core-1." The interface bandwidth parameter defines an amount of bandwidth that is allocated to the virtual router for each interface (or port). For example, virtual router 1 in FIG. 7 is allocated a bandwidth of 2.5 Gbps for port 1, a bandwidth of 10 Gbps for port 2, and a bandwidth of 2.5 Gbps for port M. The routing table size parameter stores a value representing the size of the routing table associated with the virtual router. The routing table pointer identifies a routing table memory entry address. In other words, the routing table pointer identifies the location at which the routing table associated with the virtual router is stored in memory.

The forwarding table size parameter stores a value representing the size of the forwarding table associated with the virtual router. The forwarding table pointer identifies a forwarding table memory entry address. In other words, the forwarding table pointer identifies the location at which the forwarding table associated with the virtual router is stored in memory. The internal interface parameter provides a unique name for the internal interface of a virtual router. As will be described further below, the virtual routers 630 include a virtual interface that allows the virtual routers 630 to communicate with one another. An exemplary internal interface parameter may be "vr-core-vi-1" for virtual router 1 (FIG. 7). The internal interface address provides an address for the internal interface of a virtual router. An exemplary internal interface address may be "10.1.1.1."

Returning to FIG. 6, the resource allocator 620 controls the allocation of resources to the virtual routers 630 using the RSIB 610. The resource allocator 620 also updates the virtual router attribute information in the RSIB 610 in response to changes to the resource sharing information.

Figure 8:
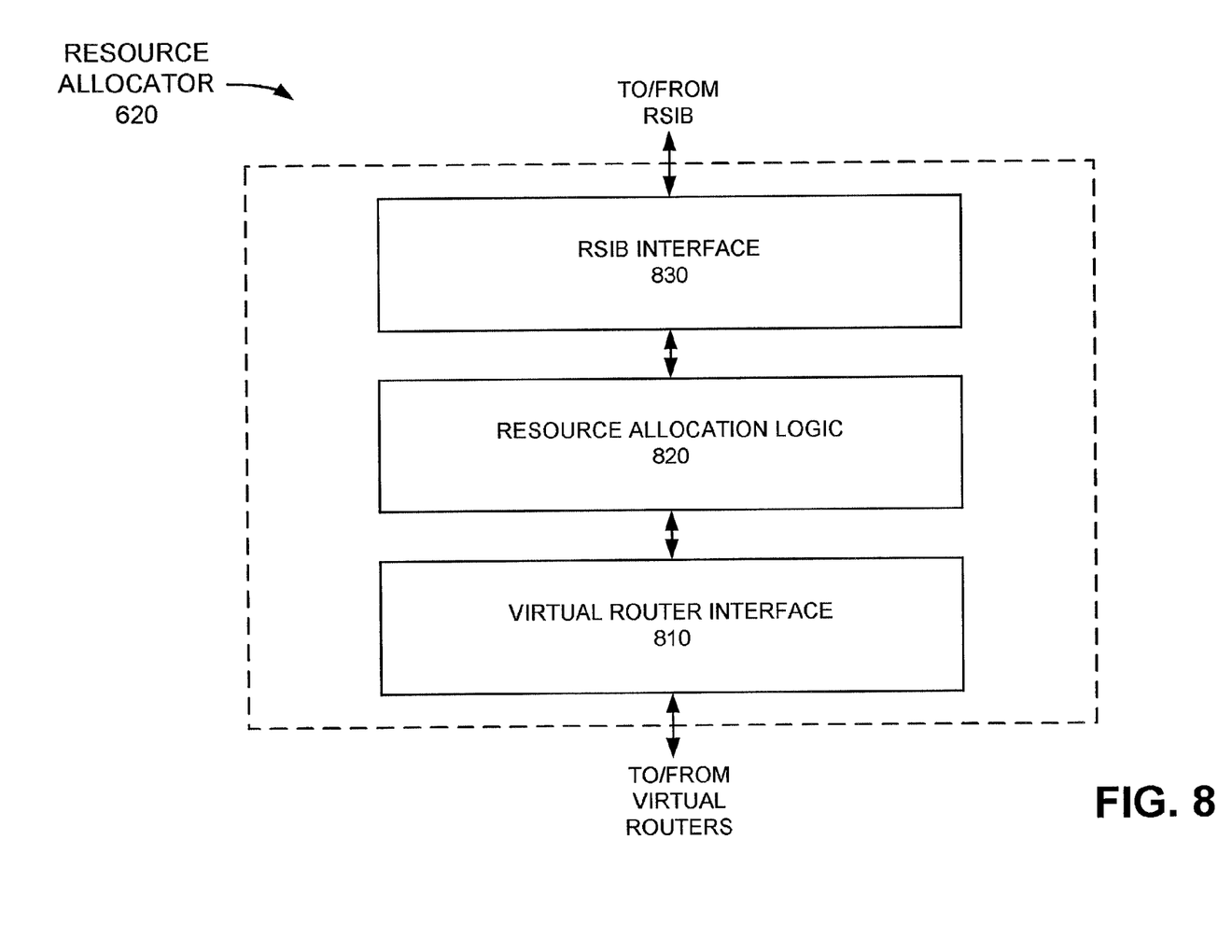
FIG. 8 illustrates an exemplary configuration of the resource allocator in an implementation consistent with the present invention.

FIG. 8 illustrates an exemplary configuration of the resource allocator 620 in an implementation consistent with the present invention. As illustrated, the resource allocator 620 includes a virtual router interface 810, resource allocation logic 820, and a RSIB interface 830. It will be appreciated that the resource allocator 620 may include other or different components (not shown) that aid in receiving, processing, or transmitting data.

Virtual router interface 810 temporarily stores allocation requests from the virtual routers 630 and routes these requests to the resource allocation logic 820. The resource allocation logic 820 determines, based on, for example, the availability of the resource, a resource priority indication associated with the virtual router that sent the request, and an authentication of the virtual router, whether to grant a virtual router's allocation request. The RSIB interface 830 acts as the interface between the resource allocator 620 and the RSIB 610. In one implementation consistent with the present invention, the RSIB interface 830 transmits updates to the attributes of the virtual routers 630 in the RSIB 610 and receives update acknowledgments messages from the RSIB 610.

Returning to FIG. 6, the virtual routers 630 may act as functionally different routers. For example, the virtual routers 620 may perform the functions of one or more regional routers, backbone routers, and/or edge routers. Each virtual router 630 within the router system 410 is associated with a virtual router profile 635. The virtual router profiles 635 define the security level, resource sharing priority, and other necessary information that allows the virtual routers 630 to access and share the resources of the router system 410.

Figure 9:
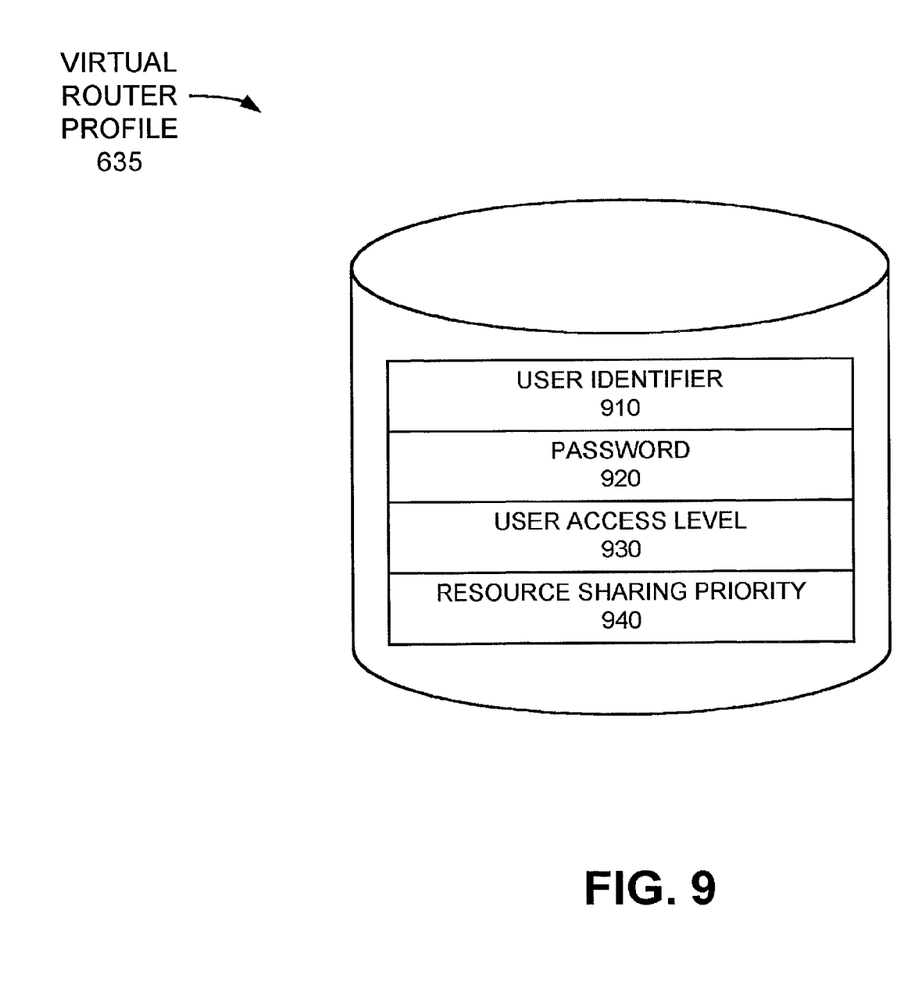
FIG. 9 illustrates an exemplary list of attributes that may be included in the virtual router profile in an implementation consistent with the present invention.

FIG. 9 illustrates an exemplary list of attributes that may be included in the virtual router profile 635 in an implementation consistent with the present invention. As illustrated, the virtual router profile 635 may include a user identifier field 910, a password field 920, a user access level field 930, and a resource sharing priority field 940. It will be appreciated that the virtual router profile 635 may include other fields that aid the resource allocator 620 in determining whether to grant a virtual router access to a shared resource.

The user identifier field 910 may store one or more unique identifiers that identify users that may access the virtual router 630. The password field 920 may store one or more unique passwords for each of the identifiers in the user identifier field 910. A password allows the router system to authenticate a user attempting to access a virtual router 630.

The user access level field 930 may store data representing a user's level of access to the resources of the router system 410. In one implementation, the user access level field 930 may store a different access level indication for each of the shared resources in the router system 410. A system administrator may assign access levels to users of the virtual router 630 based on, for example, the management domain in which the virtual router resides and any existing service agreements between the system administrator and the virtual router users.

The resource sharing priority field 940 may store data defining the resource sharing priority of the virtual router 630. The resource sharing priority field 940 may store a different priority indication for each shared resource in the router system 410.

Exemplary Processing

Figure 10:
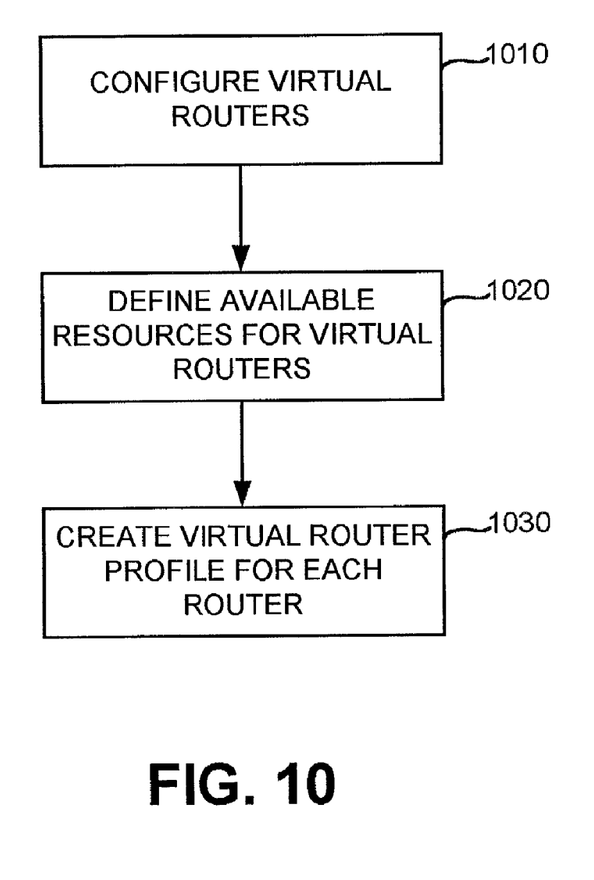
FIG. 10 illustrates an exemplary process for configuring a router system according to an implementation consistent with the present invention.

FIG. 10 illustrates an exemplary process for configuring the router system 410 according to an implementation consistent with the present invention. Processing may being with a system administrator accessing the router system 410 via the SA device 230 or by accessing the router system 410 directly. The system administrator may configure multiple virtual routers 630 in the router system 410 based on requirements of the particular network within which the router system 410 is to be implemented (act 1010). To configure the virtual routers 630, the system administrator may set attributes for each of the virtual routers 630 in the RSIB 610. As described above, the attributes may include a virtual router identifier, an interface bandwidth parameter, a routing table size parameter, a routing table pointer, a forwarding table size parameter, a forwarding table pointer, an internal interface parameter, and an internal interface address.

The system administrator may define the available resources to be shared by the virtual routers 630 (act 1020). If the resources are to be statically allocated, the system administrator may also set a maximum degree for which the resources may be shared. If, on the other hand, the resources are to be dynamically allocated, the resource allocator 620 may balance the resources shared by the virtual routers 630.

Once the virtual router attributes have been set in the RSIB 610, the system administrator may create a virtual router profile 635 for each virtual router 630 (act 1030). The system administrator may set one or more user identifiers, along with one or more passwords for each identifier. The router system 410 may later use the identifier and password(s) to authenticate a user attempting to access a virtual router 630.

The system administrator may also set a user access level for each user identifier associated with a particular virtual router 630. As described above, the user access level defines the level to which a user will be granted access to the router system resources. The system administrator may set resource sharing priority for each virtual router 630. The resource allocator 620 may determine whether to allocate a resource between contending virtual routers 630 based on the resource sharing priority associated with the contending virtual routers 630.

Figure 11:
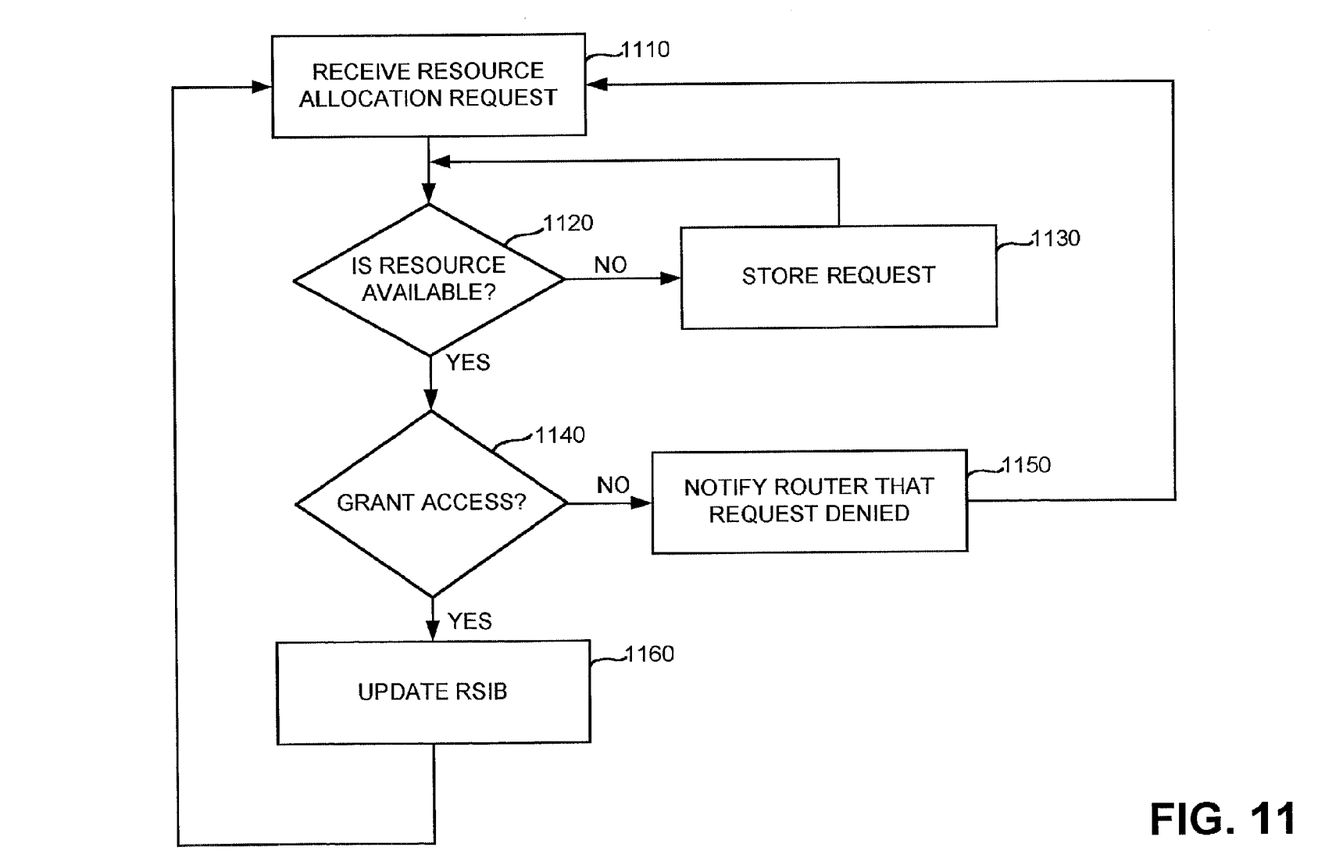
FIG. 11 illustrates an exemplary process, performed by the resource allocator, for allocating resources in an implementation consistent with the present invention.

FIG. 11 illustrates an exemplary process performed by the resource allocator 620 for allocating resources in an implementation consistent with the present invention. Processing may begin with the resource allocator 620 receiving a resource allocation request from one or more of the virtual routers 630 (act 1110). The request may be initiated by an authenticated user of the virtual router 630 or by the virtual router 630 itself. Upon receipt of the request, the resource allocator 620 may determine whether the resource identified in the request is currently available (act 1120). The resource may not be available if the resource is currently allocated to a virtual router 630 other than the virtual router 630 that sent the request.

If the resource allocator 620 determines that the requested resource is not available, the resource allocator 620 may store the request until the resource becomes available (act 1130). Processing may then return to act 1120. Alternatively, the resource allocator 620 may deny the request and notify the virtual router 630 to this effect. In such a situation, processing may return to act 1110 and the virtual router 630 may continue to request the resource until the resource becomes available or until a predetermined period of time has elapsed.

If the resource allocator 620 determines that the resource is available, the resource allocator 620 may then determine whether access to the resource by the virtual router 630 should be granted (act 1140). In making such a determination, the resource allocator 620 may determine whether another virtual router 630 has requested access to the resource. If so, the resource allocator 620 may grant the request to the virtual router 630 having the highest priority level indication stored in its virtual router profile 635. The resource allocator 620 may also determine whether access to the resource should be granted based on security information (i.e., user identifier and/or password) in the virtual router's profile 635. For example, the virtual router 630 may transmit an identifier and password to the resource allocator 620 with the resource allocation request. The resource allocator 620 may use the security information to authenticate the request from the virtual router 630.

If the resource allocator 620 determines that the request should not be granted, the resource allocator 620 may notify the virtual router 630 of such (act 1150) and processing may return to act 1110. If, on the other hand, the resource allocator 620 grants the request, the resource allocator 620 updates the virtual router's attribute information in the RSIB 610 (act 1160). The virtual router 630 is then granted access to the resource. Processing may then return to act 1110.

Figure 12:
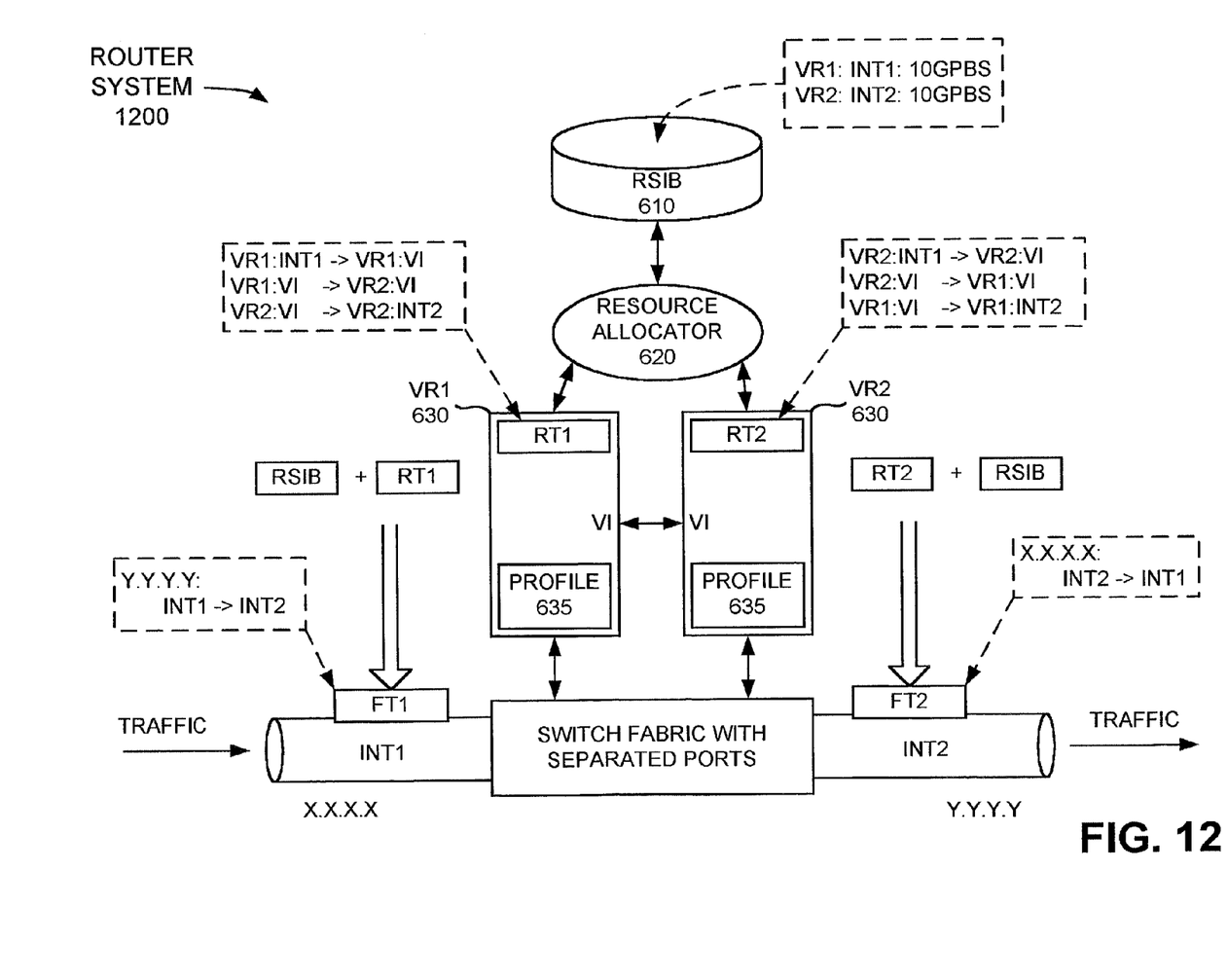
FIG. 12 illustrates an exemplary configuration of a router system in which two virtual routers share switching fabric bandwidth in an implementation consistent with the present invention.

FIG. 12 illustrates an exemplary configuration of a router system 1200 in which two virtual routers (VR1 and VR2) 630 share switching fabric bandwidth in an implementation consistent with the present invention. It is assumed with respect to FIG. 12 that the virtual routers 630 do not share port bandwidth, control resources (i.e., the virtual routers 630 use different memories for storing the routing and forwarding tables), routing processes, or forwarding processes. It will be appreciated that this scenario is exemplary and other scenarios in which the virtual routers 630 share resources (data resources, control resources, routing processes, and forwarding processes) are also possible, as described in copending, commonly assigned, U.S. patent application Ser. No. 10/084,917, filed Mar. 1, 2002, and entitled, "Resource Allocation in Virtual Routers," the contents of which are incorporated in their entirety herein.

As illustrated, the virtual routers 630 share switching fabric bandwidth that is managed by the resource allocator

620. The virtual routers 630 communicate with one another via the virtual interface (VI) by using an internal protocol. The forwarding processes, in conjunction with the forwarding tables (FTs), control routing of data within the router system 1200.

For example, the forwarding processes may control the routing of traffic from a first port (e.g., INT1) to a second port (e.g., INT2) within the router system 1200. In one implementation, a forwarding table for a virtual router 630 is created from the virtual router's routing table (RT) and information from the RSIB 610. An exemplary entry for defining the path from the first port (INT1) to the second port (INT2) in forwarding table 1 (FT1) is illustrated in the dashed block in FIG. 12. The routing table for virtual router 1 (RT1) may, for example, include entries for defining the paths from the first port (INT1) to the virtual interface (VI) of virtual router 1, from the VI of virtual router 1 to the VI of virtual router 2, and from the VI of virtual router 2 to the second port (INT2). Similarly, FIG. 12 illustrates exemplary entries for the routing and forwarding tables associated with virtual router 2.

Figure 13:
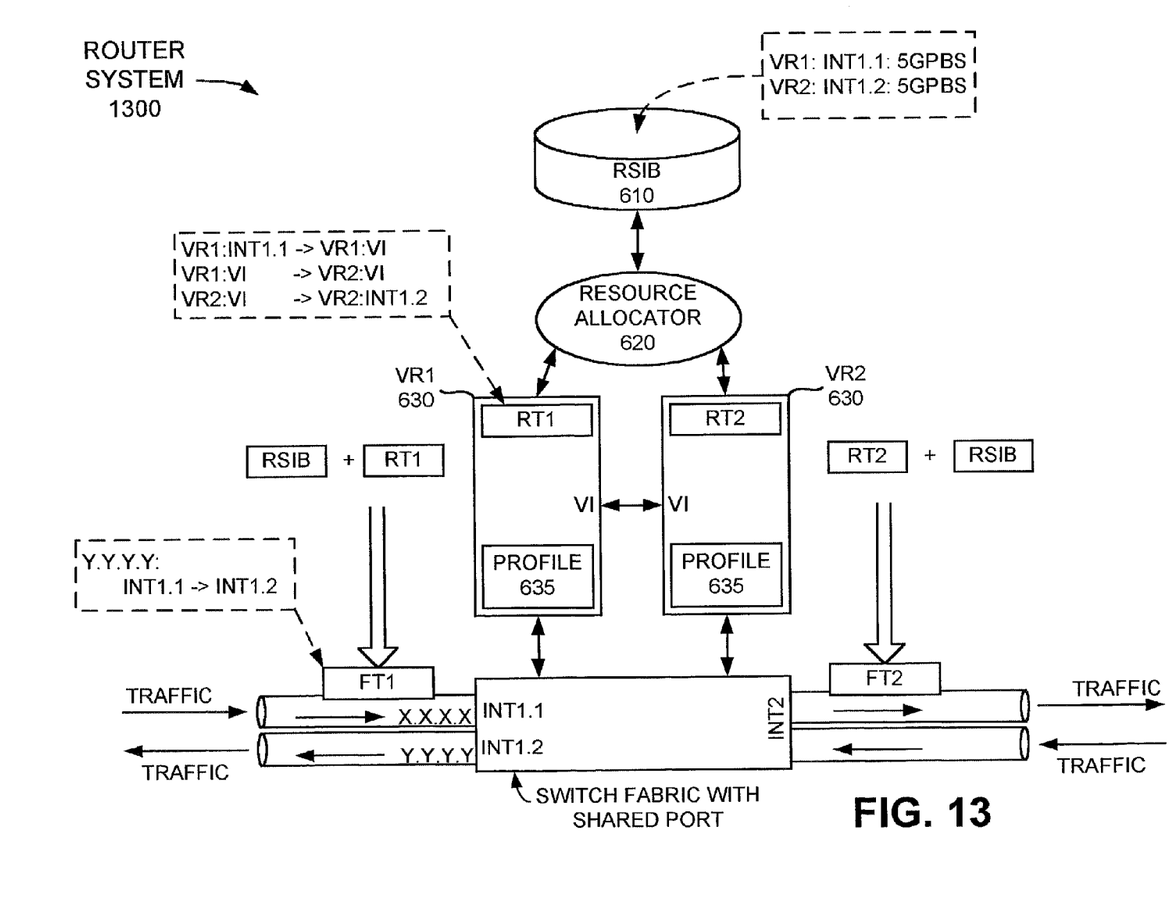
FIG. 13 illustrates another exemplary configuration of a router system in which two virtual routers share switching fabric bandwidth and the bandwidth of a port in an implementation consistent with the present invention.

FIG. 13 illustrates another exemplary configuration of a router system 1300 in which two virtual routers (VR1 and VR2) 630 share switching fabric bandwidth and the bandwidth of a port in an implementation consistent with the present invention. As in FIG. 12, it is assumed that the virtual routers 630 do not share control resources (i.e., the virtual routers 630 use different memories for storing the routing and forwarding tables), routing processes, or forwarding processes.

As illustrated, the virtual routers 630 share switching fabric bandwidth and the bandwidth of a port (i.e., interface 1). In this example, the resource allocator 620 manages the allocation of each of these shared resources. The resource allocator 620 allocates half of the bandwidth of interface 1 to VR1 (INT1.1) and half of the bandwidth to VR2 (INT1.2). The resource allocator 620 stores this allocation information in the RSIB 610. In the example illustrated in FIG. 13, each virtual router is allocated a bandwidth of 5 Gpbs for interface 1 (INT1). These two sub-interfaces (INT1.1 and INT1.2) of INT1 can be transparent to each other. Traffic can be forwarded through INT1.1 to INT1.2 inside of the line card or switch fabric. INT1.2. The forwarding table associated with VR1, for example, may include an entry defining the path from INT1.1 to INT 1.2. These entries are denoted by dashed blocks in FIG. 13.

CONCLUSION

Systems and methods, consistent with the present invention, provide a routing system that includes a group of virtual routers sharing one or more resources. The routing system also includes a resource allocator that controls the virtual routers' access to the shared resources based on availability of the resource and/or priority and security information associated with the virtual routers. By eliminating the need to implement multiple, separate physical routers in a network, the number of line cards used to provide interconnection between multiple physical routers can be reduced, resulting in tremendous cost savings.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 10 and 11, the order of the acts may vary in other implementations consistent with the present invention. Moreover, non-dependent acts may be performed in parallel.

It will be appreciated that the present invention can be implemented in hardware, software, or a combination of hardware and software. Thus, the present invention is not limited to any specific combination of hardware circuitry and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A router system comprising:
a plurality of virtual routers, at least one virtual router of the plurality of virtual routers is configured to operate as a backbone router and at least one other virtual router of the plurality of virtual routers is configured to operate as a regional router; at least one resource shared by the plurality of virtual routers; and a resource allocator configured to control access to the at least one resource by the at least one virtual router of the plurality of virtual routers and the at least one other virtual router of plurality of virtual routers based on security information and priority information.

2. The router system of claim 1 wherein the router system is a single high-capacity router.

3. The router system of claim 1 wherein each of the plurality of virtual routers is associated with a router profile that is configured to store one or more virtual router attributes.

4. The router system of claim 3 wherein the one or more virtual router attributes include at least one of an identifier, a password, resource access level information, or resource sharing priority information.

5. The router system of claim 4 wherein the one or more virtual router attributes include resource sharing priority information for each of the at least one resource.

6. The router system of claim 3 wherein the resource allocator controls access to the at least one resource based on at least one of the one or more virtual router attributes.

7. The router system of claim 1 wherein the at least one resource includes one or more of a control resource, a data resource, a routing process, or a forwarding process.

8. The router system of claim 1 wherein the at least one resource includes one or more of switching fabric bandwidth or port bandwidth.

9. The router system of claim 1 wherein the at least one resource includes a common memory.

10. The router system of claim 1 further comprising:
a resource-shared information base configured to maintain the at least one resource.

11. The router system of claim 10 wherein the resource-shared information base is further configured to store a plurality of attributes for each of the plurality of virtual routers.

12. The router system of claim 11 wherein the plurality of attributes includes at least two or more of a virtual router identifier, a bandwidth parameter for each interface with which a respective virtual router is associated, a routing table size parameter, a routing table pointer, a forwarding table size parameter, a forwarding table pointer, an internal interface parameter, or an internal interface address.

13. A method for configuring a router system, comprising:
configuring a plurality of virtual routers, at least one virtual router of the plurality of virtual routers being configured to operate as a backbone router and at least one other virtual router of the plurality of virtual routers being configured to operate as a regional router; defining at least one resource to be shared by the plurality of virtual routers; creating a router profile for each of the plurality of virtual routers, the router profile including security information and priority information; and
controlling access to the at least one resource by the at least one virtual router of the plurality of virtual routers and the at least one other virtual router of the plurality of virtual routers based on the security information and the priority information.

14. The method of claim 13 wherein the configuring includes:
setting a plurality of attributes for each of the plurality of virtual routers.

15. The method of claim 14 wherein the plurality of attributes include at least two of:
a virtual router identifier, a bandwidth parameter for each interface with which a respective virtual router is associated, a routing table size parameter, a routing table pointer, a forwarding table size parameter, a forwarding table pointer, an internal interface parameter, or an internal interface address.

16. The method of claim 13 wherein the at least one resource includes one or more of a control resource, a data resource, a routing process, or a forwarding process.

17. The method of claim 13 wherein the at least one resource includes one or more of switching fabric bandwidth or port bandwidth.

18. The method of claim 13 wherein the at least one resource includes a common memory.

19. The method of claim 13 wherein the router profile includes at least one of a user identifier, a user password, resource access level information, or resource sharing priority information.

20. The method of claim 19 wherein the router profile includes resource sharing priority information for each of the at least one resource.

21. In a router system, a method for controlling allocation of a group of shared resources by a plurality of virtual routers, the method comprising: receiving, at a resource allocator, a request for allocation of one shared resource of the group of shared resources from at least one virtual router of the plurality of virtual routers, the request including security information and priority information; determining, at the resource allocator, whether the request is authentic based on the security information; granting, at the resource allocator, access to the one shared resource by the at least one virtual router of the plurality of virtual routers, when the request is authentic and based on the priority information.

22. The method of claim 21 wherein the router system includes a resource-shared information base that is configured to store resource allocation information for each of the plurality of virtual routers, and
wherein the method further comprises:
updating the resource-shared information base based on the granting.

23. The method of claim 21 wherein the priority information relates to the one shared resource.

24. A router system comprising:
a plurality of virtual routers configured to share at least one resource, each of the plurality of virtual routers being associated with a router profile that defines a security level and resource sharing priority for the virtual router;
a resource-shared information base configured to maintain the at least one resource; and
a resource allocator configured to receive a request for access to the at least one resource and grant access to the at least one resource to one of the plurality of virtual routers based on the security level and resource sharing priority associated with the one virtual router.

25. The router system of claim 24 wherein the resource-shared information base is further configured to:
store a plurality of attributes for each of the plurality of virtual routers.

26. The router system of claim 25 wherein the plurality of attributes includes at least two of:
a virtual router identifier, a bandwidth parameter for each interface with which a respective virtual router is associated, a routing table size parameter, a routing table pointer, a forwarding table size parameter, a forwarding table pointer, an internal interface parameter, or an internal interface address.

27. A router system comprising:
a first virtual router configured to operate as a backbone router;
a second virtual router configured to operate as a regional router;
at least one resource that is shared by the first virtual router and the second virtual router; and
a resource allocator configured to control access to the at least one resource by the first virtual router and the second virtual router based on security information and priority information.

* * * * *